United States Patent [19]

Lin et al.

[11] Patent Number: 5,148,380
[45] Date of Patent: Sep. 15, 1992

[54] METHOD AND APPARATUS FOR CONSERVING POWER IN A DATA PROCESSING SYSTEM

[75] Inventors: Steve Lin, Taipei; Kent Kao, Keelung; Robert Hsu, Taipei Hsien, all of Taiwan

[73] Assignee: Acer Incoporated, Taiwan

[21] Appl. No.: 573,628

[22] Filed: Aug. 27, 1990

[51] Int. Cl.$^5$ ............................................. G06F 1/00
[52] U.S. Cl. ............................................. 364/707
[58] Field of Search ................................. 364/707

[56] References Cited

U.S. PATENT DOCUMENTS

| | | | |
|---|---|---|---|
| 4,614,880 | 9/1986 | Go et al. | 364/707 |
| 4,649,373 | 3/1987 | Bland et al. | 364/707 |
| 4,716,463 | 12/1987 | Stacy et al. | 364/707 |
| 4,964,073 | 10/1990 | Watanabe | 364/707 |
| 5,051,936 | 9/1991 | Gleason, III et al. | 364/707 |

OTHER PUBLICATIONS

Application Notes AP-252, "Microcontroller Handbook", Intel Corporation, pp. 9-54.
"Hardware Description of the 8051, 8051 and 80C51", Intel Corporation.

Primary Examiner—Long T. Nguyen
Attorney, Agent, or Firm—Greg T. Sueoka

[57] ABSTRACT

In a battery powered data processing system having an oscillator and a microprocessor connected to the oscillator, the microprocessor has a programmable standby mode and circuit responsive to the standby mode for disabling the oscillator. The system uses a sensor circuit to generate a reset signal to reset the microprocessor from the power down mode when a key is depressed. A signal generator is responsive to signals from the oscillator for disabling the reset signal.

13 Claims, 1 Drawing Sheet

METHOD AND APPARATUS FOR CONSERVING POWER IN A DATA PROCESSING SYSTEM

TECHNICAL FIELD

The present invention relates to the conservation of power in battery powered processing systems.

BACKGROUND

The usefulness of a battery-powered device such as a portable personal computer will typically increase if the time duration of its battery sustained operation can be prolonged. Given the fixed amount of electricity which a battery can store, the time duration of a battery-powered device must in turn be prolonged by conservation of its power consumption.

Power consumption is conserved in prior art by switching a device's circuits to a low-power, standby mode at times when operation of the circuits is not needed. Such conservation is commonly applied to keyboard devices where the "think" time of its operators is usually comparable, if not longer, than the "keying-in" time.

One prior art method of power conservation is disclosed in U.S. Pat. No. 4,649,373, "Powered Conservation System in Battery Powered Keyboard Device Including A Microprocessor" issued to P.M. Bland et al. Another prior art power conservation method is disclosed in Application Notes AP-252 of the "Microcontroller Handbook" published by Intel Corporation, page 9-54. In these prior art methods, one or more output port of the microprocessor is used to set the device into a lower power, standby mode.

In accordance with the present invention, power conservation is achieved without the use of any input-/output port of the microprocessor.

SUMMARY OF THE INVENTION

The present invention relates to a power economical microprocessor system which comprises an oscillator and a microprocessor connected to the oscillator. The microprocessor has a programmable standby mode and circuit responsive to the standby mode for disabling the oscillator. The system has a sensor circuit generating a reset signal to reset said microprocessor from said power down mode and a signal generator responsive to signals from said oscillator for disabling said reset signal.

DESCRIPTION OF THE PREFERRED EMBODIMENT

Figure 1:
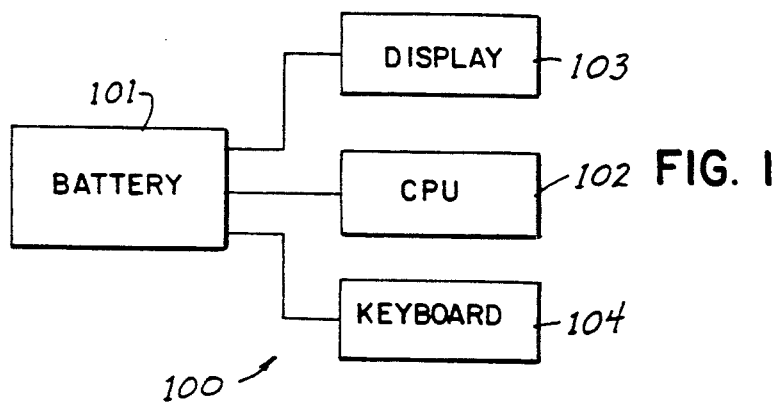
FIG. 1 shows a battery-powered microprocessor system in which the present invention is embodied.

FIG. 1 is a diagram of a battery powered computer system 100 wherein the present invention is embodied. The computer system 100 comprises a battery 101 powering a central processing unit 102, a video display device 103 and a keyboard device 104.

Figure 2:
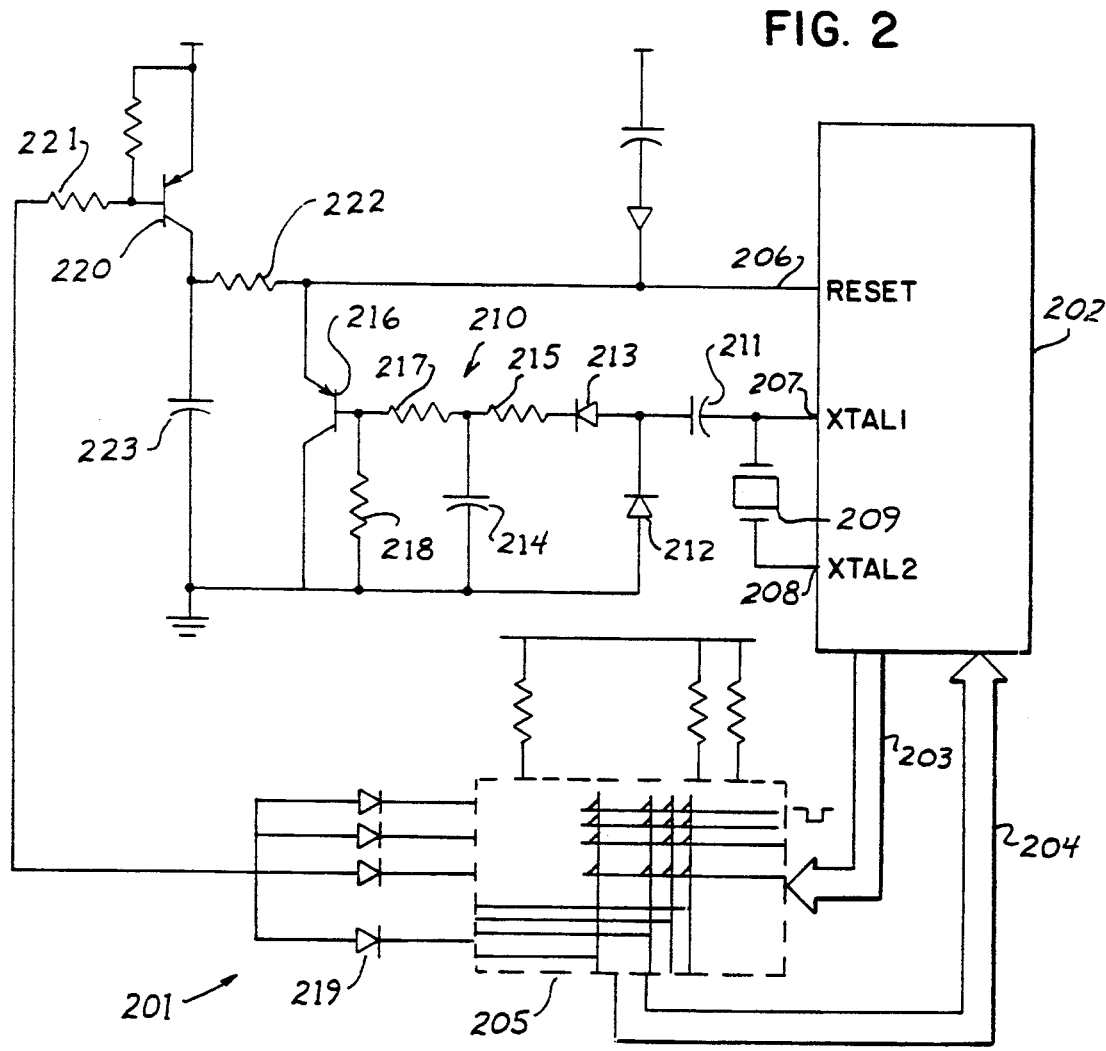
FIG. 2 shows the circuit of the keyboard device within the microprocessor system in which the present invention is used to economize power consumption.

A schematic circuit of the keyboard device 104 is shown in FIG. 2. The keyboard device 104 has a matrix keyboard 201 controlled by a microprocessor 202 executing instructions stored in a memory (not shown). This microprocessor may be an 80C51BH micro-controller chip made by Intel Corporation.

The control of the matrix keyboard 201 by the microprocessor 202 is achieved using techniques known in the art. Basically, the microprocessor 202 sends scan signals onto a set of scan lines 203 through its output ports. The scan lines 203 intersect a set of sense lines 204 to form a matrix 205. Each intersection of the matrix 205 is a point where a keypad (not shown) can be placed. When a keypad is depressed, the sense line 203 and the scan line 204 forming the corresponding intersection will contact, thereby communicating the scan signal to the sense line. Based upon the scan signals being sent and the sense signals being received, the microprocessor 202 can then identify the particular keypad being depressed.

Microprocessor 202 has a reset input 206 and two terminals, the XTAL1 207 and XTAL2 208, for connecting to an external oscillator 209, typically a crystal oscillator. One output of the oscillator 209 is coupled to a rectifier 210 through a capacitor 211. The rectifier comprises diodes 212 and 213, capacitor 214 and resistor 215 combining to rectify the alternating signals from the oscillator 209 into direct current signals.

The output of the rectifier 210 is coupled to the base terminal of a transistor 216 through resistor 217. Resistor 217 operates to limit the current from the rectifier 210 to the base of the transistor 216. A resistor 218 connecting the base of transistor 216 to ground operates to limit any current leakage when the voltage level of the base is low.

The microprocessor 202 executes software stored in a memory (not shown). Within the software is a routine which calculates the time elapsed during which predefined activities in the system have not occurred. These activities include keying in of a keypad on the matrix keyboard 205. When the elapsed time exceeds a predetermined period, microprocessor 202 will execute an instruction to invoke the low power, standby mode. In the 80C51BH micro-controller, for example, the standby mode will be invoked by setting bit 1 in the PCON register, using a byte instruction such as

| ORL | PCON, #2 |
| --- | --- |

Once the standby mode is invoked, the oscillator 209 will be stopped and voltage at the output of the rectifier 210 will be low and transistor 216 will be shut off.

Each sense line 203 of the matrix keyboard 205 is connected to the negative terminal of one of a corresponding number of diodes 219. The positive terminals of the diodes 219 are coupled to the base terminal of an PNP transistor 220 through a resistor 221. One of the purposes of the diodes 219 is to isolate transistor 220 from the sense lines 203.

When a keypad is depressed, a low level voltage will appear at the corresponding sense line 203, causing a drop in the voltage level of the base terminal of transistor 220.

A voltage drop at the base of the PNP transistor 220 will cause it to conduct. The collector of the transistor 220 is coupled to the reset terminal 206 of the microprocessor 202 through a resistor 222. When transistor 220 conducts, the voltage at the reset terminal 206 of the microprocessor 202 will become high, thereby resetting it from the standby mode and microprocessor 202 will start executing the software residing in its memory.

The collector terminal of transistor 220 is also connected to a capacitor 223. When transistor 220 conducts, capacitor 223 will be charged.

When microprocessor 202 comes out of the standby mode, one of the functions it performs is to reactivate the oscillator 209. Once oscillator 209 is reactivated, the rectifier 210 will again generate a voltage, causing transistor 216 to conduct. When transistor 216 conducts, it draws current from capacitor 223 and at the same time lowers the voltage level of the reset input 206. As long as transistor 216 conducts, the voltage level at the reset input 206 of microprocessor 202 will remain low.

Under normal operation, a keyboard would typically be depressed for more than twenty milliseconds. However, when a keypad is depressed, the microprocessor 202 will switch from standby mode to normal operating mode within two to five milliseconds. Therefore, the microprocessor 202 will not miss a key stroke even if it was in standby mode when the key is depressed.

Because the power conservation, by way of switching between normal operating mode and the standby mode, is achieved without requiring the use of any input/output pin of the microprocessor 202, the circuit of the present invention can thus provide conservation of power without restricting the flexibility of the microprocessor.

While the invention has been particularly described with reference to the preferred embodiment, it will be understood by those skilled in the art that various changes in form and detail may be made without departing from the spirit and scope of the invention.

We claim:

1. An apparatus for conserving power in a data processing system, said apparatus comprising:
   (a) an oscillator;
   (b) a microprocessor connected to the oscillator, the microprocessor having a programmable standby mode and a circuit responsive to said standby mode for disabling the oscillator;
   (c) a sensor circuit having an input and an output for generating a reset signal in response to a predefined activity in said processing system to reset said microprocessor from said standby mode, the input coupled to receive a signal indicating a predefined activity, and the output coupled to the microprocessor; and
   (d) a signal generator having a generator input and a generator output, said signal generator responsive to signals from said oscillator for disabling said reset signal, the generator input coupled to the oscillator and the generator output coupled to the microprocessor.

2. The apparatus of claim 1, wherein said generator comprises a rectifier circuit having an input and an output, the input of said rectifier circuit coupled to said oscillator and the output of said rectifier coupled to said microprocessor.

3. The apparatus of claim 2, wherein said signal generator further comprises a transistor having a base, a collector and an emitter, the base connected to the output of said rectifier circuit, the collector coupled to ground, and the emitter coupled to the microprocessor.

4. The apparatus of claim 1, wherein said sensor circuit comprises a transistor having a base, a collector and an emitter, the base coupled to receive the signal indicating the predefined activity, the collector coupled to the microprocessor and the emitter coupled to power.

5. The apparatus of claim 4, wherein said sensor circuit further comprises a capacitor connected between the collector of the transistor and ground.

6. The apparatus of claim 1, wherein said predefined activity is a key stroke of a keyboard, and wherein said sensor circuit comprises a first transistor having a base, a collector and an emitter, the base coupled to said keyboard, a capacitor connected between the collector of the first transistor and ground, and the emitter of the first transistor coupled to power; and wherein said signal generator comprises a rectifier circuit and a second transistor having a base, a collector and an emitter, the base of the second transistor coupled to an output of said rectifier circuit, the collector of the second transistor coupled to ground, and the emitter of the second transistor coupled to the microprocessor.

7. A data processing system comprising:
   (a) a central processing unit;
   (b) a display device coupled to the central processing unit for outputting information therefrom;
   (c) a keyboard device coupled to the central processing unit for inputting information therefrom;
   (d) a power supply system comprising one or more batteries supplying power to the central processing unit, the display device and the keyboard device; and wherein the keyboard device comprises:
      (i) an oscillator;
      (ii) a microprocessor connected to the oscillator, the microprocessor having a programmable standby mode and a circuit responsive to said standby mode for disabling the oscillator;
      (iii) a sensor circuit having an input and an output for generating a reset signal in response to a predefined activity in said data processing system to reset said microprocessor from said standby mode, the input coupled to receive a signal indicating a predefined activity, and the output coupled to the microprocessor; and
      (iv) a signal generator having a generator input and a generator output, said signal generator responsive to signals from said oscillator for disabling said reset signal, the generator input coupled to the oscillator and the generator output coupled to the microprocessor.

8. The data processing system of claim 7, wherein said signal generator comprises a rectifier circuit having an input and an output, the input of said rectifier circuit coupled to said oscillator and the output of said rectifier coupled to said microprocessor.

9. The data processing system of claim 8, wherein said signal generator further comprises a transistor having a base, a collector and an emitter, the base connected to the output of said rectifier circuit, the collector coupled to ground, and the emitter coupled to the microprocessor.

10. The data processing system of claim 7 wherein said sensor circuit comprises a transistor having a base, a collector and an emitter, the base coupled to receive the signal indicating the predefined activity, the collector coupled to the microprocessor and the emitter coupled to power.

11. The data processing system of claim 10 wherein said sensor circuit further comprises a capacitor connected between the collector of said transistor and ground.

12. A data processing system as in claim 7, wherein said predefined activity is a key stroke of a keyboard.

13. The data processing system of claim 7, wherein said predefined activity is a key stroke of a keyboard, and wherein said sensor circuit comprises a first transistor having a base, a collector and an emitter, the base coupled to said keyboard, a capacitor connected between the collector of the first transistor and ground, and the emitter of the first transistor coupled to power; and wherein said signal generator comprises a rectifier circuit and a second transistor having a base, a collector and an emitter, the base of the second transistor coupled to an output of said rectifier circuit, the collector of the second transistor coupled to ground, and the emitter of the second transistor coupled to the microprocessor.

* * * * *

UNITED STATES PATENT AND TRADEMARK OFFICE
CERTIFICATE OF CORRECTION

PATENT NO. : 5,148,380

DATED : September 15, 1992

INVENTOR(S) : Steve Lin, Kent Kao, and Robert Hsu

It is certified that error appears in the above-identified patent and that said Letters Patent is hereby corrected as shown below:

Title page, item
[75] Inventors: line 2, "Keelung" should be --Keelung City--.
Title page, item [56]
OTHER PUBLICATIONS, line 3, "8051, 8051" should be --8051, 8052--.

Col. 1, line 34, "lower power" should be --low power--.

Signed and Sealed this

Fourteenth Day of September, 1993

Attest:

BRUCE LEHMAN

Attesting Officer

Commissioner of Patents and Trademarks